United States Patent [19]

Germann

[11] 4,250,713
[45] Feb. 17, 1981

[54] APPARATUS FOR CONDUCTING LIQUID HELIUM BETWEEN A TRANSPORTER AND AN ELECTRIC MACHINE

[75] Inventor: Willy Germann, Wurenlos, Switzerland

[73] Assignee: BBC Brown, Boveri & Company, Limited, Baden, Switzerland

[21] Appl. No.: 6,126

[22] Filed: Jan. 24, 1979

[30] Foreign Application Priority Data

Jan. 26, 1978 [CH] Switzerland ............................ 841/78

[51] Int. Cl.$^3$ .............................................. F17C 7/02
[52] U.S. Cl. ........................................ 62/55; 137/51; 285/47; 285/DIG. 5; 310/54; 310/64
[58] Field of Search .................. 62/505, 55, 514 R; 310/52, 53, 54, 64; 137/51; 285/47, DIG. 5

[56] References Cited

U.S. PATENT DOCUMENTS

| | | | |
|---|---|---|---|
| 3,626,717 | 12/1971 | Lorch | 62/505 |
| 3,845,639 | 11/1974 | Smith, Jr. et al. | 62/505 |
| 3,950,959 | 4/1976 | Coureau | 62/55 |
| 3,991,588 | 11/1976 | Laskaris | 62/55 |
| 4,056,745 | 11/1977 | Eckels | 62/505 |

Primary Examiner—Ronald C. Capossela
Attorney, Agent, or Firm—Burns, Doane, Swecker & Mathis

[57] ABSTRACT

An apparatus for providing selective fluid communication between a helium transporter and an electric machine with superconductive exciter windings includes a coupling of the transporter which is mated to an undriven end of the shaft of the electric machine. Passages in the coupling and shaft supply liquid helium to the winding and return warmed liquid helium to the transporter. Quick interchangeability of the transporter is facilitated by a bayonet fitting and a spring biased sealing arrangement between corresponding passages in the coupling and shaft. A pressure actuated valve in the passages is provided to interrupt fluid communication when the pressure of the liquid helium falls below a predetermined value. A centrifugal force actuated valve in the passages is provided to interrupt fluid communication when the shaft speed falls below a predetermined value.

7 Claims, 1 Drawing Figure

U.S. Patent     Feb. 17, 1981     4,250,713
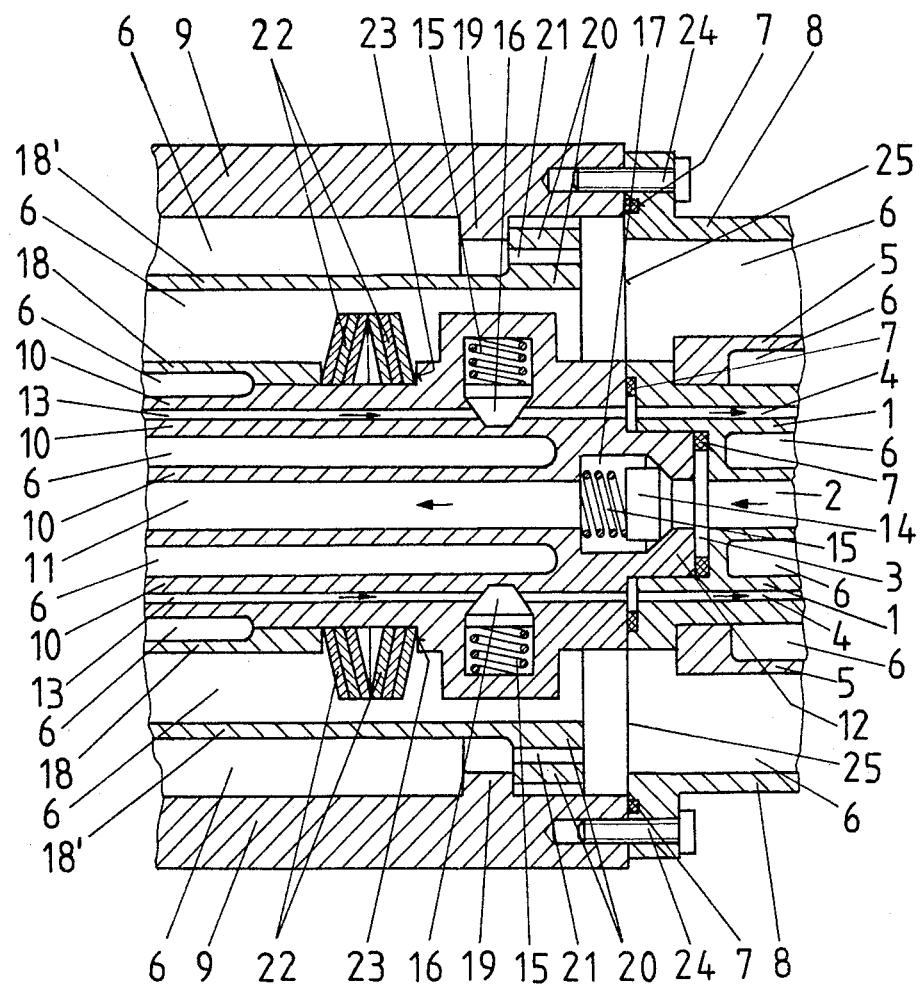

APPARATUS FOR CONDUCTING LIQUID HELIUM BETWEEN A TRANSPORTER AND AN ELECTRIC MACHINE

BACKGROUND OF THE INVENTION

Electric machines with superconductive windings are known in the prior art. For example, a turbogenerator with superconductive exciter windings is illustrated in the article, "Turbogeneratoren mit supraleitender Erregerwicklung", Bull. SEV 64 (1973) of August 17, 18 in FIG. 3 on page 1043. In order to achieve superconductivity, the windings must be cooled, as with a liquified gas. In the device shown in the article, the exciting winding is cooled by liquid helium. At the nondriven side of the shaft there is located among other items a helium transporter. Cold liquid helium flows through this helium transporter from the condenser unit into the exciter winding. Subsequently, the heated helium returns to the transporter from the machine. The helium transporter can fail and that failure will naturally cause a stoppage of the turbogenerator.

It is the object of the present invention to provide a connecting arrangement for a helium transporter of an electric machine with a superconductive exciter winding which will make possible a rapid separation of the helium transporter from the electric machine as well as a quick and simple installation of a new unit, thereby significantly reducing the down-time of the electric machine in cases of failure of the helium transporter.

This and other objects and features of the present invention will be apparent from this written description when read in conjunction with the drawings herein.

THE DRAWINGS

The FIGURE is a cross-sectional view of the end of a shaft of an electric machine and a coupling of a liquid helium transporter illustrating a preferred embodiment of the present invention.

DETAILED DESCRIPTION

The present invention relates to an apparatus for providing selective fluid communication between a liquid helium transporter and a electric machine having a superconducting winding. The shaft of the electric machine and a coupling of the helium transporter are formed with first passages for supplying liquid helium to the electric machine when the transporter and the electric machine are coupled. Second passages are provided in the shaft and coupling for returning heated liquid helium from the electric machine when the transporter and electric machine are coupled. A pressure actuated valve in one of the first and second passages interrupts fluid communication when the pressure of the liquid helium falls below a predetermined value, such as is the case if the helium transporter fails. A centrifugal force actuated valve in one of the first and second passages interrupts fluid communication when the shaft speed falls below a predetermined value.

In a preferred embodiment of the present invention, the pressure actuated valve is located in the supply passages and the centrifugal force actuated valve is located off axis with respect to the axis of rotation of the shaft and interrupts fluid communication in the return passages.

The apparatus is designed to permit quick attachment and interchange of helium transporters with the electric machine. To this end, a bayonet fitting and a spring biased sealing arrangement are provided in the coupling and shaft.

With reference to the drawings, the coupling of a helium transporter is denoted by the numeral 1 and an end of the shaft of an electric machine is denoted by the numeral 9. In the Figure the shaft end 9 and the coupling 1 are shown connected together.

The coupling 1 of the helium transporter is provided with a supply duct 2 for cold liquid helium. The coupling 1 contains a cylindrical recess 3 and return or collecting ducts 4. The coupling 1 rests on a thermally insulated support element 5. The supporting element 5 is carried by a cylindrical member 8.

In the apparatus, thermal insulation is achieved by means of vacuum barriers 6 such as those located in the supporting element 5. A circular seal 7 is provided in the recess 3 of the coupling 1.

The shaft end 9 of the electric machine includes a central body 10, concentric with the axis of rotation of the shaft. In the embodiment shown in the drawing, the central body 10 is formed in a single piece. However, for easy construction the central body 10 could be fabricated from several parts by welding or bolting. The details of construction of the central body are not essential to an understanding of the invention and have, therefore, been omitted.

The central body 10 of the shaft end 9 contains a supply duct 11 adapted to mate with the supply duct 2 to form a first passage for cold liquid helium. To facilitate mating of the supply ducts 2 and 11, a cylindrical plug 12 is provided on the axis of rotation of the shaft which matches the recess 3 of the helium transporter coupling 1.

The central body 10 is also formed with collecting ducts which are adapted to be mated with the collecting ducts 4 in the helium transporter coupling 1 to provide second passages for returning warm liquid helium to the helium transporter.

Within an enlarged annular region 17 of the supply duct 11, there is located a valve body 14 biased against a valve seat by a coil spring 15. The valve is actuated by pressure differentials in the supply ducts 2 and 11. In the collecting ducts 13, there are located valve bodies 16 which are biased by coil springs 15. It will be readily understood that, since the valve bodies are located off axis with respect to the axis of rotation of the shaft, the valve bodies will move radially outward responsive to centrifugal force, thereby opening the collecting ducts 13.

A thermally insulating support element 18 is integrally formed with a thermally insulating supporting element 18', or is connected mechanically therewith. Advantageously, the supporting elements 5, 18 and 18' are made of titanium, because titanium has a high mechanical strength and a relatively low thermal conductivity.

The inner surface of the shaft end 9 is provided with a bearing ring 19 which carries a bayonet fitting. A flange 20 of the support element 18' functions as the mating part of the bayonet fitting which includes the bearing ring 19. The flange 20 may be formed with linking bores 21 for interconnecting the vacuum chamber 6 to provide thermal insulation throughout the assembly.

Between the supporting element 18 and a supporting surface 23 of the central body 10, there are arranged several cup springs 22 which bias the central body 10 against the coupling 1 of the helium transporter to facilitate sealing engagement between the various conduits. The cylindrical member 8 of the helium transporter 1 and the shaft end 9 are connected by bolts 24. The contact area between the helium transporter and the shaft end 9 with the central body 10 is denoted generally by the numeral 12.

With continued reference to the drawings, the operation of the apparatus of the present invention will be described. The valves 14 and 16 are normally opened during the operation of the electric machine. The pressure of the cold liquid helium coming from the condenser unit will act on the valve body to hold the valve open. The valve bodies 16 are biased away from their respective valve seats by the centrifugal force created by the rotation of the shaft, thus allowing the return of heated helium through the collecting or return ducts 4 and 13. At a predetermined low speed of rotation, the valve bodies 16 will close, and as a result of a dropping pressure of the helium present in the supply duct 11, the valve body 14 will also close automatically. Such a condition would occur, for example, when the helium transporter is detached from the electric machine.

In the drawing the valve bodies 14 and 16 are shown in their rest position, i.e., their positions when fluid communication through the various conduits is interrupted. In this configuration the helium transporter may be separated from the shaft end 9 by removal of the bolts 24. By pulling it in axial direction, the cylindrical plug 12 of the central body may be removed from the recess 3 of the helium transporter. The helium transporter may be replaced by a new helium transporter by mating the cylindrical plug 12 of the central body 10 with a recess of the new helium transporter and by tightening the bolts 24.

It will be clear that the practice of the present invention is not limited to the arrangement of ducts, valves and chambers shown in the drawings. For example, the cup springs 22 may be replaced by other biasing elements.

The apparatus as set forth above provides for an effective seal between the helium transporter and the shaft end. The valves function to prevent leakage from the electric machine during times when the helium transporter is being connected to the shaft end. The pressure control valve will close off the supply duct automatically when the pressure of the liquid helim drops below a predetermined value, for example, when the helium transporter is being removed. The centrifugal force control valve permits automatic closing of the return ducts when the speed of the electric machine shaft drops below predetermined valve. The valves, in addition, function as pressure release valves, should the pressure of the helium inside the electric machine become excessive due to overheating.

The arrangement of the socket, bayonet fitting and seals insures proper positioning of the helium transporter with respect to the shaft end and the precise fitting and sealing of the supply and return ducts at the area of contact, and also insures that quick attachment and detachment of the transporter can be accomplished.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

I claim:

1. An apparatus for providing selective fluid communication between a liquid helium transporter and an electric machine having a superconducting winding, comprising:
    a shaft of the electric machine and a coupling of the helium transporter, wherein first passages are provided in the shaft and coupling for supplying liquid helium to the electric machine when the transporter and the electric machine are coupled, and wherein second passages are provided in the shaft and coupling for collecting warmed liquid helium from the electric machine when the transporter and electric machine are coupled;
    pressure actuated valve means, provided in one of said first and second passages, for interrupting fluid communication when the pressure of the liquid helium falls below a predetermined value; and
    centrifugal force actuated valve means, provided in one of said first and second passages, for interrupting fluid communication when the shaft speed falls below a predetermined value.

2. The apparatus of claim 1
    wherein the pressure actuated valve means interrupts fluid communication in the first passages; and
    wherein the centrifugal force actuated valve means is located off-axis with respect to the axis of rotation of the shaft, and interrupts fluid communication in the second passages.

3. A coupling apparatus for providing selective fluid communication between interchangeable cryogen containers and the superconducting windings of an electric machine comprising:
    a stationary conduit member including a supply duct and a collecting duct attached to and communicating with said cryogen container and a rotating central body in an end of a shaft of the electric machine having a supply duct for connection with the supply duct of the conduit member and a collecting duct for connection with the collecting duct of the conduit member and a pressure sensitive valve means for interrupting the flow of cryogen responsive to change in cryogen pressure occurring when cryogen containers are interchanged.

4. The apparatus of claim 3, wherein one of the central body and the conduit member are provided with means for biasing the ducts of the shaft in sealing engagement with the respective ducts of the conduit member.

5. The apparatus of claim 3, further comprising a centrifugal force sensitive valve for interrupting the flow of cryogen when the electric machine is stopped to interchange cryogen containers.

6. The apparatus of claim 3, wherein one of the central body or the end of the conduit member is provided with at least one centering plug which is matched by a socket in the opposed part.

7. The apparatus of claim 3, wherein the central body in the shaft end is provided with a quick-closing fitting, preferably of the bayonet type.

* * * * *